United States Patent [19]
Ernst et al.

[11] 3,967,710
[45] July 6, 1976

[54] CLUTCH SHIFTER

[75] Inventors: Horst M. Ernst, Eltingshausen; Manfred Brandenstein, Aschfeld; Armin Olschewski, Schweinfurt, all of Germany

[73] Assignee: SKF Industrial Trading and Development Company, B.V., Jutphaas, Netherlands

[22] Filed: Dec. 6, 1974

[21] Appl. No.: 530,309

[30] Foreign Application Priority Data
Dec. 21, 1973  Germany.......................... 2363840

[52] U.S. Cl. ............................. 192/98; 192/110 B
[51] Int. Cl.² ..................................... F16D 19/00
[58] Field of Search ...................... 192/98, 110 B

[56] References Cited
UNITED STATES PATENTS

| | | | |
|---|---|---|---|
| 2,359,364 | 10/1944 | Katcher | 192/98 |
| 3,631,954 | 1/1972 | Coaley | 192/98 |
| 3,741,361 | 6/1973 | Brandenstein | 192/110 B |
| 3,815,715 | 6/1974 | Maucher | 192/98 |
| 3,877,557 | 4/1975 | Maucher | 192/98 |

FOREIGN PATENTS OR APPLICATIONS 2,078,122  5/1971  France ............................. 192/98

*Primary Examiner*—Samuel Scott
*Assistant Examiner*—Randall Heald
*Attorney, Agent, or Firm*—Daniel M. Rosen

[57] ABSTRACT

A clutch shifter engagement structure including a sliding sleeve and an antifriction bearing. The sliding sleeve includes a radially extending portion and the bearing a flange. A buckle engages both the radially extending portion and the bearing flange, the buckle further including extending arms adapted for engagement, as by a disengaging fork.

9 Claims, 3 Drawing Figures

CLUTCH SHIFTER

BACKGROUND OF THE INVENTION

The invention relates to clutch shifters, and particularly to a clutch shifter with a sliding sleeve and an antifriction bearing with roller rings made of sheet metal. In this construction the nonrotating ring is fastened in the sliding sleeve by at least one buckle, embracing a radial part of the sliding sleeve and a flange of the roller ring with radial play.

A clutch shifter of this design is known from the German Provisional Pat. No. 1,944,839. To permit movements of adjustment during centering, the antifriction bearing can move in a radial direction on the sliding sleeve. During actuation of the clutch, the sliding sleeve with the antifriction bearing is moved in an axial direction by a disengaging fork. However, no information concering the application of the disengaging fork is given in the German Provisional Pat. No. 1,944,839.

It is therefore the object of the invention to provide a clutch shifter of the type described above with provision enabling a disengaging fork to be engageable in a relatively simple manner, without special working or hardening of the sliding sleeve to produce working surfaces necessary for this purpose.

SUMMARY OF THE INVENTION

The foregoing object is achieved in accordance with the invention by providing the buckle with arms for the reception of a disengaging fork. Two buckles are preferably provided at the circumference of the sliding sleeve, so that a disengaging fork can be easily attached to the buckle by a snapping-in, thereby forming the whole device as an undetachable unit. In case wear phenomena appear, the whole sliding sleeve need not be replaced, it being sufficient to replace the damaged buckles.

In a further embodiment of the invention, the buckle contains a tongue which snaps into an impression or the like located in the radial part of the sliding sleeve. In this way, the buckle is undetachably attached to the sliding sleeve.

According to a further characteristic of the invention, the radial surface of the buckle entering into contact with a disengaging fork is hardened, so that the sliding sleeve itself need not be hardened and no distortion due to hardening can thus appear on it.

In accordance with the invention, it is further additionally advantageous if the arms of the buckle engage in a twistproof manner with a recess notched in a radially inward direction.

BRIEF DESCRIPTION OF THE INVENTION

Additional advantages and characteristics of the invention will become apparent from the following description of a preferred embodiment, taken in conjunction with the appended drawings, wherein:

FIG. 1 is an axial section along I — I of FIG. 3 through a clutch shifter formed according to the invention, FIG. 2 is a top view of the clutch shifter, and FIG. 3 is a rear view of the clutch shifter.

DETAILED DESCRIPTION

Figure 1:
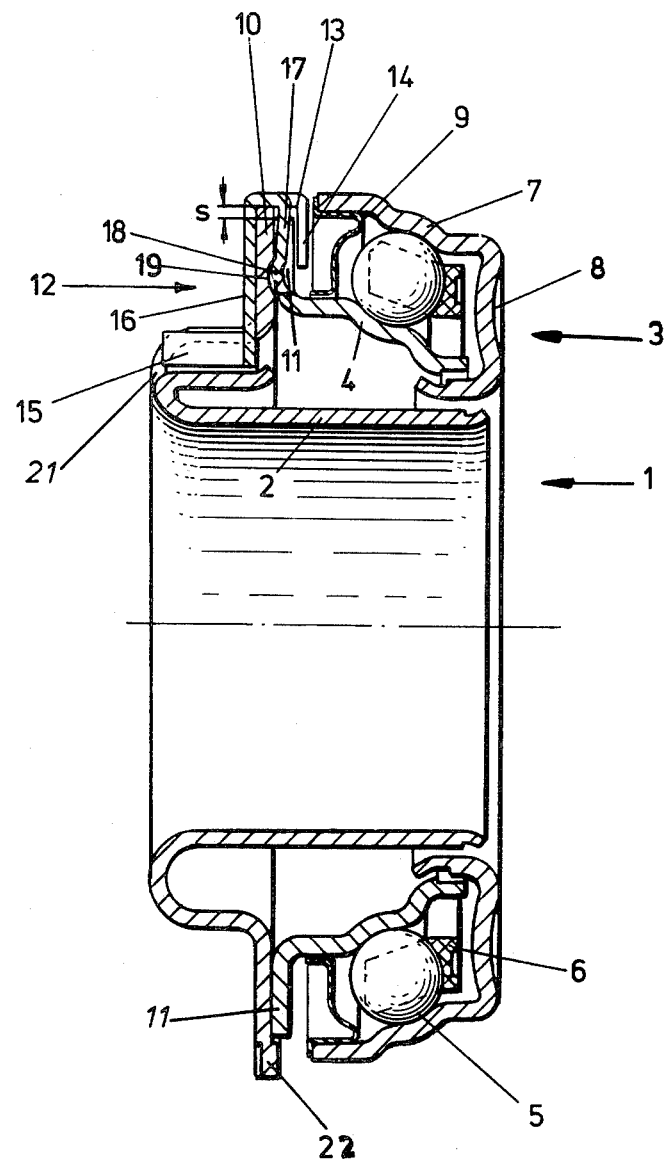

Referring to FIG. 1, there is shown a clutch shifter 1 with a sliding sleeve 2 made of sheet metal and an antifriction bearing 3. The antifriction bearing 3 contains an inner ring 4 made of sheet metal, rolling member 5, a cage 6, and an outer ring 7, also made of sheet metal. A front surface 8 of the outer ring 7 is made annularly concave and, in the built-in state, is in contact with clutch levers of a clutch (not shown). Also attached to the outer ring 7 is a sealing disk 9, which serves to seal the antifriction bearing 3 against the loss of lubricant.

The sliding sleeve 2 contains a radial part 10 and the inner ring 4 contains a radial flange 11 or individual lugs, which are embraced by a buckle 12. It can be clearly seen in FIG. 1 that there is a play s with respect to the upper edge of the radial flange 11 and the base 13 of the buckle 12, through which the antifriction bearing 3 can be displaced in a radial direction when the clutch levers (not shown) carry out a centering over the front surface 8. In the axial direction, there is a slight play between the embracing part 14 of the buckle 12 and the radial flange 11, so that no frictional gripping of the antifriction bearing 3 will take place here.

Figure 2:
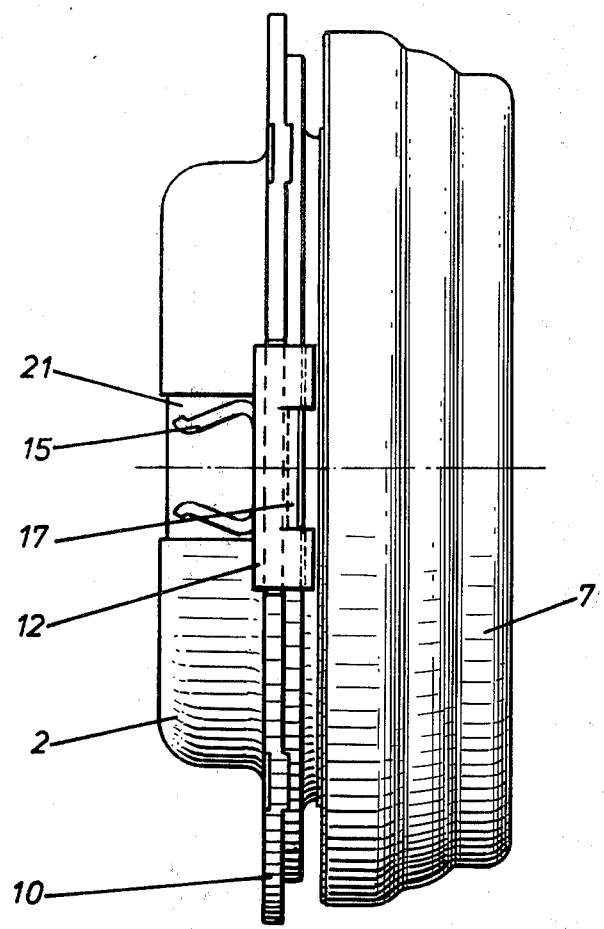

The buckle 12 also has arms 15, which can be seen in top view in FIG. 2. These arms 15 serve to receive a disengaging fork (not shown) and serve for guidance and fixation of the disengaging fork. The arms 15 are made curved, so that the disengaging fork need only be snapped in during assembly on the assembly line. As follows further from FIG. 1, the arms of the buckle 12 engage in a twistproof manner with a recess 21 notched out of the sliding sleeve 2. In this way, the point of attachment of the disengaging fork can be located very far inward in a radial direction.

Figure 3:
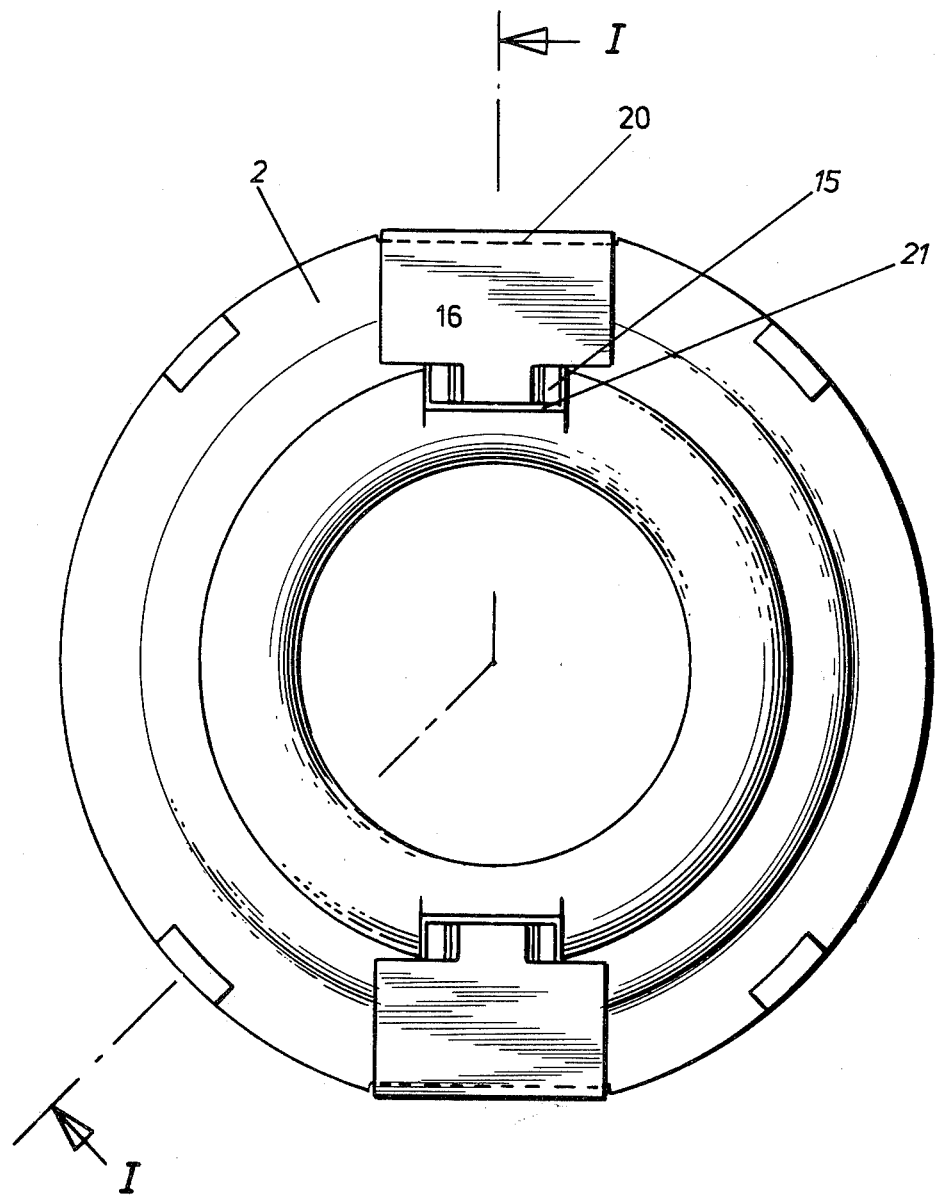

The surface 16 of the buckle 12, seen in FIG. 3, which is normal to the axis and is in contact with the disengaging fork, is hardened. This makes a hardening of the sliding sleeve unnecessary, so that the danger of distortion phenomena on the sliding sleeve 2, which is made in a noncutting manner, is prevented.

The embracing part 14 of the buckle 12 is made in one piece with at least one tongue 17, which is bent elastically at its end 18. This end 18 snaps into an impression 19 in the radial part 10 of the sliding sleeve 2, so that, after assembly, the antifriction bearing 3, sliding sleeve 2, and buckle 12 form an undetachable unit. The tongue 17 can also be seen in top view in FIG. 2. In the region of the tongue 17 and the embracing part 14, the sliding sleeve 2 can be made flattened, as seen from the broken line 20 of FIG. 3.

The radial play s of the antifriction bearing 3 shown in FIG. 1 can be narrowed if, on the radial part 10 of the sliding sleeve 2, there are several cams 22 which prevent the radial flange 11 of the inner ring 4 from sliding over them. Furthermore, impressions (not shown) to prevent the twisting of the inner ring 4 with respect to the sliding sleeve 2 can be improved on the circumference of the radial part 10.

What is claimed is:

1. A clutch shifter comprisng a sliding sleeve having a radially extending portion and an antifriction bearing having a rotating ring and a nonrotating ring including a flange, fastening means for fastening said nonrotating ring in the sliding sleeve, said fastening means including at least one buckle embracing said radial portion of said sliding sleeve and said flange of said nonrotating ring with a radial play, said buckle including a plurality of extending arms for the reception of a disengaging fork.

2. The clutch shifter as claimed in claim 1, wherein said buckle means includes a tongue and said radially extending portion includes an impression, said buckle being fixed to said radially extending portion by contact between said tongue and said impression.

3. The clutch shifter as claimed in claim 1, wherein the radially extending face portion of said buckle, which enters into contact with a disengaging fork, is hardened.

4. The clutch shifter as claimed in claim 1, wherein said arms of said buckle engage in a twistproof manner with a recess on said sliding sleeve, said recess notched in a radially inward direction.

5. A clutch shifter engagement structure comprising a sliding sleeve having a radially extending portion and an antifriction bearing engageable with said sliding sleeve, said bearing including an inner nonrotating ring and an outer rotating ring, said inner nonrotating ring including a flange, buckle means embracing said flange and said radially extending portion of said sliding sleeve, said buckle means including a plurality of extending engagement arms extending away from said buckle.

6. The clutch shifter of claim 5, wherein said buckle means includes at least a first and second buckle positioned at spaced locations about the circumference of said sliding sleeve, each of said buckles including a plurality of engaging arms.

7. The clutch shifter of claim 5, wherein said buckle means includes a tongue and said radially extending portion includes an impression, said buckle being fixed to said radially extending portion by contact between said tongue and said impression.

8. The clutch shifter of claim 5, wherein a radially extending face portion of said buckle overlies said radially extending portion of said sliding sleeve, said face portion being hardened.

9. The clutch shifter of claim 5, wherein said arms of said buckle engage in a twistproof manner with a recess on said sliding sleeve, said recess notched in a radially inward direction.

* * * * *